United States Patent [19]

Duyster et al.

[11] 4,339,274

[45] Jul. 13, 1982

[54] BINDING MATERIALS BASED UPON MAGNESIUM COMPOUNDS

[75] Inventors: Hubert Duyster, Ronnenberg; Günter Voigt; Gerhard Budan, both of Kassel, all of Fed. Rep. of Germany

[73] Assignee: Kali und Salz Aktiengesellschaft, Kassel, Fed. Rep. of Germany

[21] Appl. No.: 156,214

[22] Filed: Jun. 3, 1980

[30] Foreign Application Priority Data

May 25, 1979 [DE] Fed. Rep. of Germany ....... 2921245

[51] Int. Cl.$^3$ .............................................. C04B 9/02
[52] U.S. Cl. ................................................... 106/106
[58] Field of Search ............... 106/105, 106, 107, 108

[56] References Cited

U.S. PATENT DOCUMENTS 2,724,655  11/1955  Williams .............................. 106/106

Primary Examiner—James Poer
Attorney, Agent, or Firm—Michael J. Striker

[57] ABSTRACT

Binding materials based upon magnesium compounds. Dry magnesium hydroxide and magnesium chloride are mixed in powder form, the weight ratio of the magnesium oxide contained in the magnesium hydroxide to magnesium chloride lying between about 0.8 and 2.0. Magnesium chloride may be used in the form of its hexahydrate, and, additionally, in the form of dihydrates. The dry product may be stored for months, in plastic sacks or bags, without coking. Thereafter, mixing the dry product with water yields magnesium oxide mortar.

4 Claims, No Drawings

BINDING MATERIALS BASED UPON MAGNESIUM COMPOUNDS

BACKGROUND OF THE INVENTION

It is known to produce so-called caustic magnesium oxide from magnesium compounds, like for example, magnesium carbonate, which caustic magnesium oxide is the basic substance of a binding material, which is able to bind considerable amounts of mineral or organic fillers. Moreover, the caustic magnesium oxide is mixed with aqueous magnesium salt solutions and fillers, and in viscous form used as cement or pavement. The binding properties of these viscous masses results essentially because oxide compounds are formed from the magnesium oxide and the mixed magnesium salts which are in dissolved form, the oxide compounds causing strengthening of the viscous mass. When, instead of the magnesium salts, magnesium chloride is preferably used, magnesium oxychloride is formed. Such mixtures consisting of magnesium oxide, water and magnesium chloride are known under the designation "Sorel Cement" or "Magnesia Mortar".

In DT-PS No. 739,164 it has already been described that for the so-called magnesia cement employing magnesium oxide (MgO) also magnesium hydroxide can be used, when a magnesium chloride solution of such concentration is used therewith that the magnesium chloride concentration in the mixture is between 21 and 27 weight percent, under addition of water which adheres to magnesium hydroxide and is chemically bound therein. Considering this method the speed of formation of oxychlorides can be quickened, when active magnesium oxide is used. However, this method is effected with difficulties, that magnesium oxide or magnesium hydroxide or magnesium chloride solution can be mixed only in situ, the value of the aspired products depends essentially upon careful observance of proportions and the concentration of magnesium chloride solution as well as on the carefulness with which the mixing is performed. There is also the requirement that this method be performed only by particularly skilled workers.

DT-PS No. 832,565 discloses dry mixtures for the production of magnesium oxide cements, a technical improvement. These mixtures are obtained from aqueous mixtures of magnesium hydroxide and magnesium chloride solution, which mixtures are concentrated after the mixing to such an extent that predominantly magnesium hydroxide and magnesium chloride are obtained in free form in addition to the obtained oxychloride. The dry mixtures are, after size reduction, if necessary after addition of filler materials, stirred and worked up with water. According to the desired composition magnesium oxide and/or magnesium chloride solution can be added to the mixture.

This procedure is supplemented by DT-PS No. 839,622 in that pastes of magnesium hydroxide and 10 to 30% magnesium chloride solution are used, wherein the mixture contains 100 parts by weight magnesium hydroxide, 100 to 700 parts by weight magnesium chloride solution. For the processing of this paste corresponding amounts of magnesium hydroxide or, respectively, oxide and water are to be added.

In the "Publication of the Research Community on Building and Living" (1966), No. 80, page 57, under the title "Pavement in Above Surface Structures", it is stated that the mixing proportions in parts by weight of magnesium chloride ($MgCl_2$) to magnesium oxide (MgO) should be approximately about 1:2.5 to 1:3.5; however, in no case less than 1:2.

As already mentioned, the manufacture of "sorel cement" or respectively "magnesia pavement mass" requires either particularly experienced trained workers, who at the building site determine the ratio of components, as well as supervise their observance, or under considerable expense and energy a dry mass consisting of magnesium oxichloride, magnesium oxide, magnesium hydroxide and magnesium chloride dry product is manufactured, which can be mixed with water prior to use.

In dependence on the composition and evaporation processes, these dry products contain the mentioned components in permanently altering compositions, so that prior to their use small scale tests must be performed, following of which outcome the proportion of dry measure to water in each individual case must be determined.

It is the object of the invention to create a dry product without high expenditure of energy, which dry product is obtained in permanently uniform compositions and can be worked up at the building site by mixing with water in permanently constant ratio.

SUMMARY OF THE INVENTION

Inventively, a method of manufacturing magnesium oxide mortar dry product has been found on the basis of magnesium hydroxide and magnesium chloride. Accordingly, dry magnesium hydroxide and magnesium chloride hydrate is intimately mixed in pulverized form, wherein the ratio in parts by weight of magnesium oxides contained in magnesium hydroxide to magnesium chloride lies between 0.8 and 2.0.

The magnesium oxide mortar dry product of the invention can contain the magnesium chloride in the form of hexahydrates, with an $MgCl_2$ percentage of 46.7 to 47.2% by weight. This product is available from technical production. In doing so, it has proved favorable to substitute for a small amount of magnesium hydroxide in the magnesium oxide mortar dry product with a corresponding quantity of active magnesium oxide having an MgO content such that its iodine number is greater than 50.

Until manufacture, the magnesium oxide mortar dry product is stored in closed silos, preferably wrapped in plastic sacks or bags. Even after storage over a month in these sacks the dry product according to the invention is still freely flowing and at any time following the mixing of components with water can be worked up as magnesium oxide mortar. Moreover, the essential volume of water amounts to from 15 to 30 weight percent, relating to the weight of dry measure according to the invention.

Due to the amount of active magnesium oxide contained in the dry product according to the invention, the period for mixing the dry product with water until the start of solidification, as defined in the draft of DIN-specification 273, volume I, from February 1977, and its determination described therein, can be varied in such a manner that with decreasing amount of active magnesium oxide the period between the mixing of the dry product with water and the start of solidification is extended, specifically from 5 minutes to as much as 30 hours.

After mixing the dry product according to the invention from magnesium hydroxide, magnesium chloride hexahydrate and active magnesium oxide in constant ratio with permanently constant amounts of water the setting reaction is reproducible within permanently similar time intervals from mixing the dry product with water. Consequently, products of similar mechanical and physical properties are obtained, except that the hitherto customary pouring of samples is unnecessary. According to the invention there is, however, also the possibility of producing the magnesium oxide mortar dry product without the addition of active magnesium oxide. Accordingly, the magnesium chloride is used in addition to the magnesium chloride hexahydrate up to a mixed portion of from 25 weight percent of the total mixture in the form of magnesium chloride dihydrate which is also available from technical production. Because of the content of magnesium chloride dihydrate in the dry product, also in this case the present time period of mixing this dry product up to the beginning and end of solidification can be varied reproducibly to such a degree that with increasing percentage of magnesium chloride dihydrate, these time periods become shortened.

For use according to the invention the magnesium oxide mortar dry product is blended with water into a viscous mixture. The amount of water lies between 15 to 30 weight percent of magnesium oxide mortar dry product. To this pasty mixture of magnesium oxide mortar dry product according to the invention, filler substances, for instance, wood shavings, sand, stone, pieces of broken glass, cut up automobile tires, can be added. In doing so, the absorptive capacity of these filler substances is allowed for and in the mix a corresponding larger amount of water is used. The obtained pasty form mixture must thereupon until the start of solidification be transformed into the desired shape. Following the conclusion of setting a formed body or a pavement layer is obtained which does not show any change in the volume compared to the volume of the pasty mixture. Moreover, the magnesium oxide mortar dry product according to the invention is able for the first time to produce clearly defined product considering its composition, which sets to a blister-free product of constant volume and superior strength factors by mixing with water in predetermined amounts.

The novel features which are considered as characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

For the magnesium oxide mortar dry product according to the invention the following raw materials are used:

magnesium hydroxide powder with 69% by weight of MgO,
magnesium chloride hexahydrate with 47% by weight of $MgCl_2$,
magnesium chloride dihydrate with 65% by weight $MgCl_2$,
active magnesium oxide with 90% by weight MgO.

All of the test data determined follows the directions of the scheme of February 1977 for DIN 273, volume 1.

EXAMPLE 1

In a mixture of 445 parts by weight of magnesium hydroxide powder, 525 parts by weight of magnesium chloride hexahydrate, 30 parts by weight of active magnesium oxide with iodine number 100 are mixed for 2 minutes. The weight ratio of $MgO:MgCl_2$ in this mixture amounts to 1.35. 1000 parts by weight of this mixture are beaten into a paste with 150 parts by weight water, and then formed into shape. It resulted in the following test data: Start of solidification: 190 minutes after mixing. End of solidification: 270 minutes after mixing.

| Days after end of solidification | Bending strength $\frac{N}{mm^2}$ | Compressive strength $\frac{N}{mm^2}$ |
|---|---|---|
| 3 | 3.0 | 11.5 |
| 7 | 6.5 | 23.5 |
| 28 | 9.0 | 36.0 |

This test data is on the average superior to the minimum requirements of the above-described DIN-specification. 1000 parts by weight of the magnesium oxide mortar dry product mentioned in the example are stored in a clear polyethylene bag for 3 months. Thereafter the dry product is further non-caking and brought into use in the previously mentioned mode of production, and with the previously mentioned measured values.

EXAMPLE 2

As in Example 1, measures of 430 parts by weight of magnesium hydroxide powder, 510 parts by weight of magnesium chloride hexahydrate, 60 parts by weight of active magnesium oxide with iodine number 130 were intimately mixed. A weight ratio of $MgO:MgCl_2$ in this mix amounted to 1.5. 1000 parts by weight of this mixture were beaten into a paste with 150 parts by weight water and then rubbed into shape. It resulted in the following test data:
Start of solidification: 120 minutes
End of solidification: 210 minutes.

| Days after end of solidification | Bending strength $\frac{N}{mm^2}$ | Compressive strength $\frac{N}{mm^2}$ |
|---|---|---|
| 3 | 3.5 | 11.5 |
| 7 | 6.0 | 18.5 |
| 28 | 8.5 | 29.0 |

For a period of 3 months a storage test of the intimately mixed dry product was conducted corresponding to the storage test in Example 1. Following this storage time the dry product was free of caking and resulted in the same good test results.

EXAMPLE 3

As in Example 1 measures of 485 parts by weight of magnesium hydroxide powder, 485 parts by weight of magnesium chloride hexahydrate, 30 parts by weight of active magnesium oxide with iodine number 148 were intimately mixed. The weight ratio of $MgO:MgCl_2$ in this mix amounted to 1.6. 1000 parts by weight of this mixture were beaten into a paste with 150 parts by weight water, and then rubbed into shape. It results in the following test data:

Start of solidification: 90 minutes
End of solidification: 210 minutes.

| Days after end of solidification | Bending strength $\frac{N}{mm^2}$ | Compressive strength $\frac{N}{mm^2}$ |
| --- | --- | --- |
| 3 | 3.3 | 10.2 |
| 7 | 5.5 | 15.3 |
| 28 | 8.0 | 20.1 |

EXAMPLE 4

The effect of active magnesium oxide on the period of time for mixing the mixture until the start of solidification of the mixture of 138 parts by weight magnesium hydroxide powder and 162 parts by weight magnesium chloride hexahydrate is shown in the following Table. From the following Table it is evident that the amount of active magnesium oxide with an iodine number of 148 admixed, resulted in the test values given in the Table. For the investigation actually 300 parts by weight of the mixture were admixed with 47 parts by weight water and the resultant paste rubbed into shape.

| Trial No. | MgO g | MgO % | Period from mixing to the start of solidification in minutes |
| --- | --- | --- | --- |
| 1 | 18 | 6 | 120 |
| 2 | 9 | 3 | 210 |
| 3 | 6 | 2 | 270 |
| 4 | 3 | 1 | 510 |
| 5 | 1 | 0.3 | 720 |
| 6 | 0.3 | 0.1 | 1,320 |

EXAMPLE 5

507 parts by weight magnesium hydroxide powder, 387 parts by weight of magnesium chloride hexahydrate, 106 parts by weight of magnesium chloride dihydrate for a period of 2 minutes were intimately mixed. 1000 parts by weight of the mixture were mixed with 245 parts by weight of water, beat into a paste and then formed into shape. The weight ratio of MgO:MgCl$_2$ in this mix amounted to 1.35. It resulted in the following test data:

Start of solidification: 210 minutes
End of solidification: 300 minutes.

| Days after end of solidification | Bending strength $\frac{N}{mm^2}$ | Compressive strength $\frac{N}{mm^2}$ |
| --- | --- | --- |
| 3 | 4.5 | 8.0 |
| 7 | 8.2 | 28.3 |
| 28 | 10.6 | 38.3 |

EXAMPLE 6

The effect of magnesium chloride dihydrates on the period of time from mixing to the start of solidification is obvious from the following table of mixtures:

| Trial No. | Composition of the mixture in parts by weight | | | | Solidification in hours | |
| --- | --- | --- | --- | --- | --- | --- |
| | Mg(OH)$_2$ | MgCl$_2$ | MgCl$_2$ . 2H$_2$O | H$_2$O | start | end |
| 1 | 480 | 500 | 20 | 173 | 5.5 | 7 |
| 2 | 507 | 387 | 106 | 224 | 3.5 | 5 |
| 3 | 546 | 227 | 227 | 280 | 1.75 | 2.75 |

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of manufacturing a magnesium oxide mortar dry product on the basis of magnesium hydroxide and magnesium chloride, comprising intimately mixing magnesium hydroxide and magnesium chloride in dry powder form; and storing the mix until time for use, the weight ratio of the magnesium oxide contained in the magnesium hydroxide to magnesium chloride lying between about 0.8 and 2.0.

2. Method according to claim 1, wherein the magnesium chloride is used in the form of its hexahydrate.

3. Method according to claim 2, wherein a small amount of magnesium hydroxide is replaced by a corresponding quantity of active magensium oxide having an MgO content such that its iodine number is greater than 50.

4. Method according to claim 2, wherein the magnesium chloride comprises in addition to magnesium chloride hexahydrate up to 25 weight percent relative to the whole mixture in the form of dihydrates.

* * * * *